E. LOOSBROCK & J. P. KLOSTER, Jr.
HAY STACKER.
APPLICATION FILED JUNE 8, 1916.
1,207,578.
Patented Dec. 5, 1916.
3 SHEETS—SHEET 1.
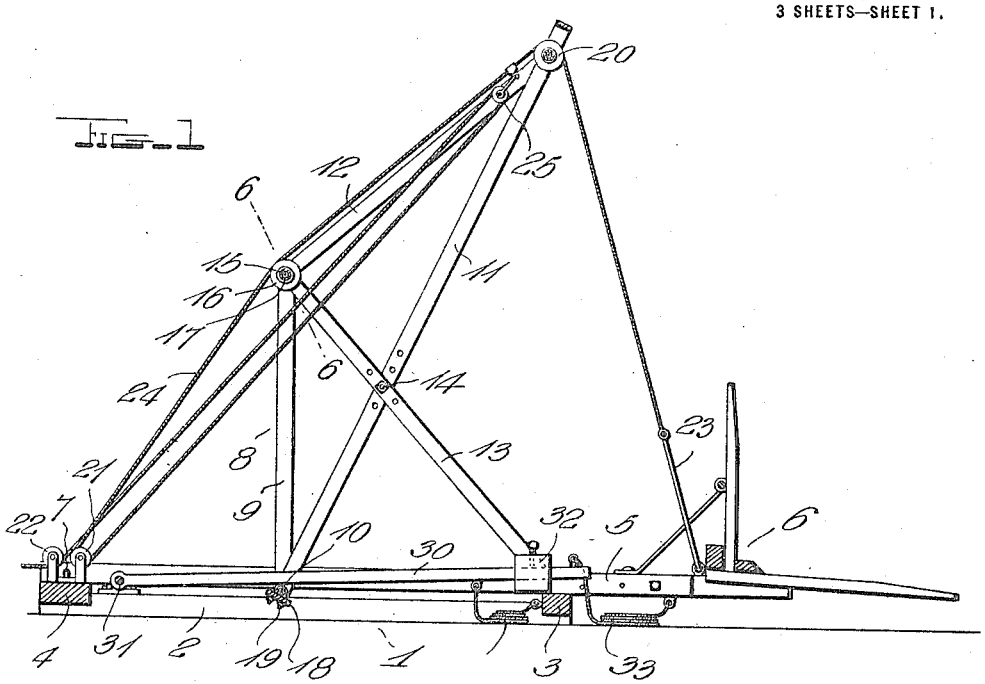
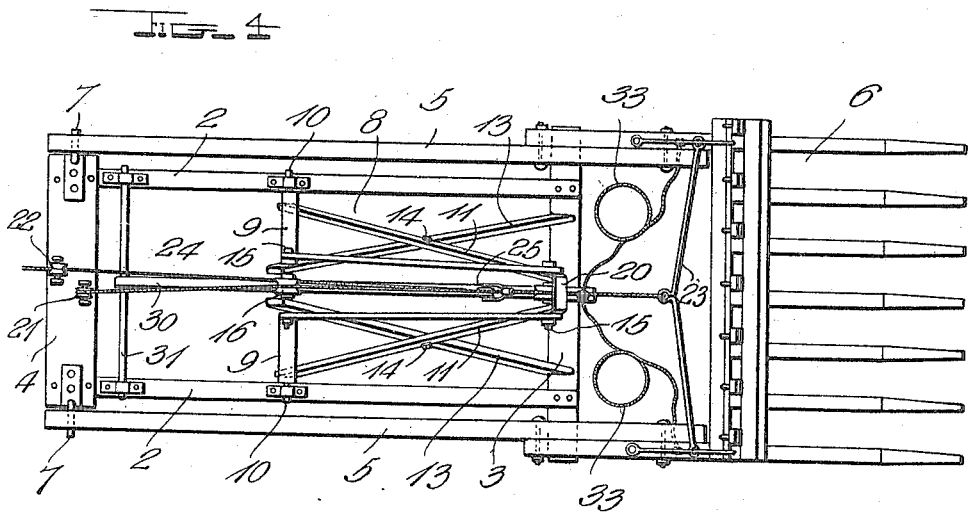
Inventors
E. Loosbrock
and J. P. Kloster, Jr.
Witness
By
Attorneys

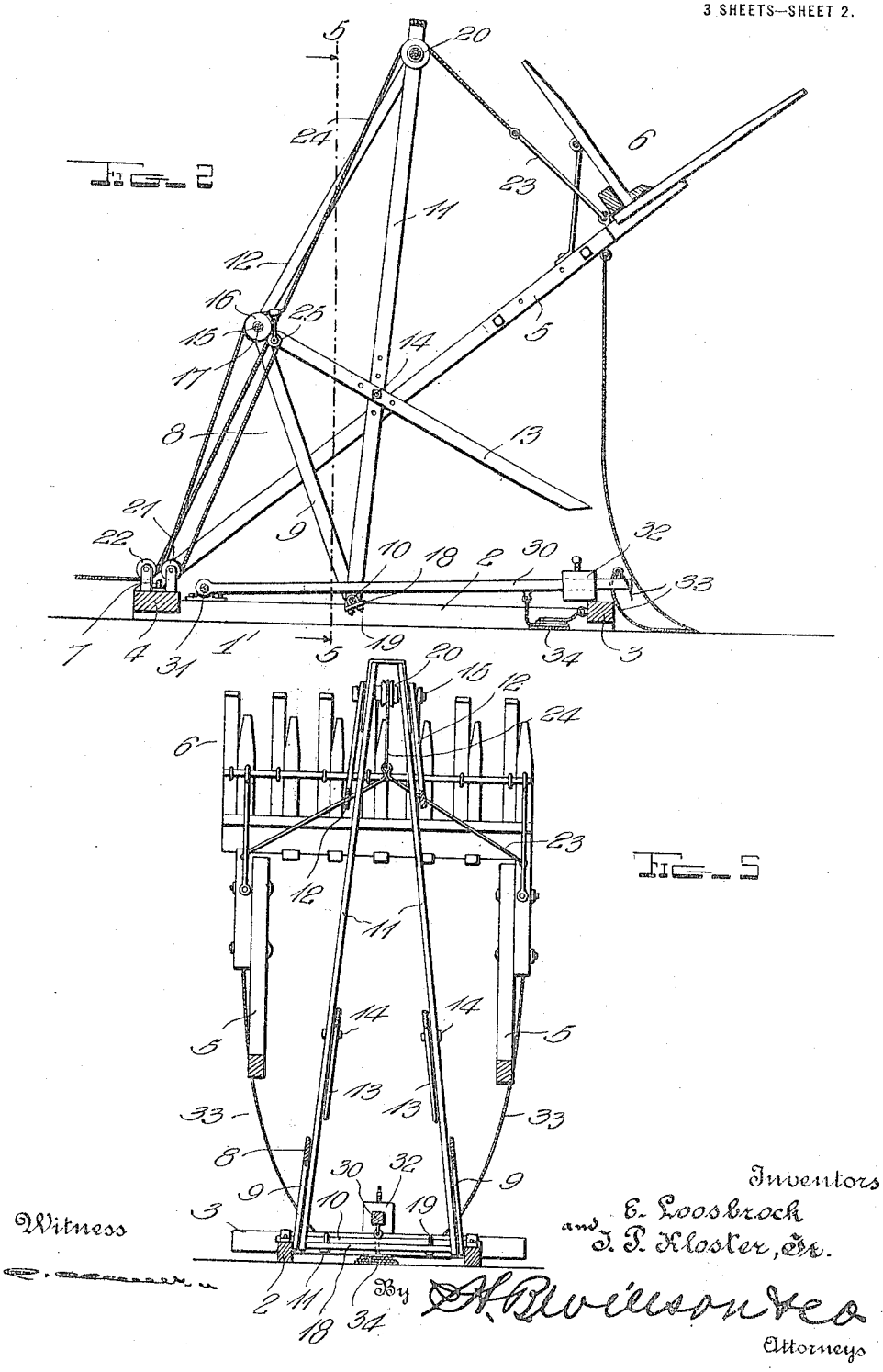

E. LOOSBROCK & J. P. KLOSTER, Jr.
HAY STACKER.
APPLICATION FILED JUNE 8, 1916.
1,207,578.
Patented Dec. 5, 1916.
3 SHEETS—SHEET 3.
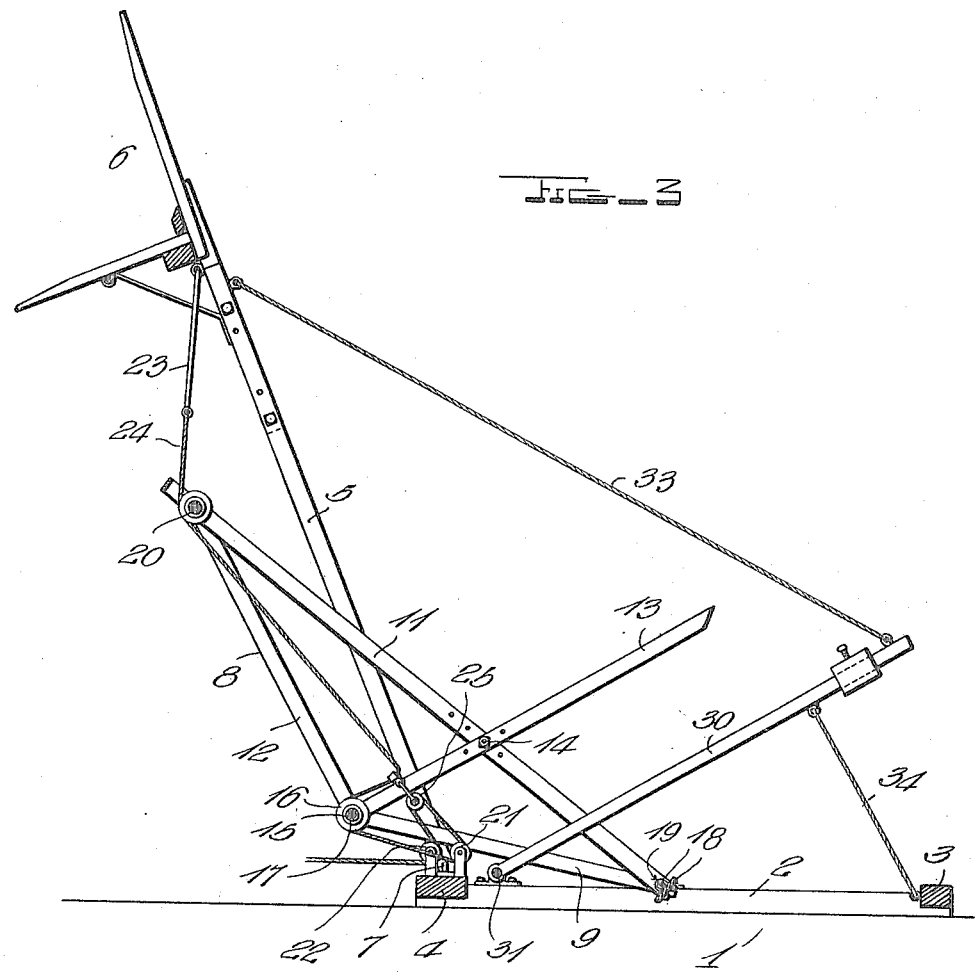
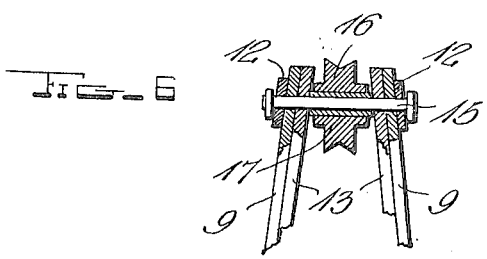
Witness
Inventors
E. Loosbrock
and J. P. Kloster, Jr.
By H. B. Willson & Co.
Attorneys

UNITED STATES PATENT OFFICE.

EDWARD LOOSBROCK AND JOHN P. KLOSTER, JR., OF PETERSBURG, NEBRASKA.

HAY-STACKER.

1,207,578.　　　　　　　　Specification of Letters Patent.　　　Patented Dec. 5, 1916.

Application filed June 8, 1916. Serial No. 102,532.

*To all whom it may concern:*

Be it known that we, EDWARD LOOSBROCK and JOHN P. KLOSTER, Jr., citizens of the United States, residing at Petersburg, in the county of Boone and State of Nebraska, have invented certain new and useful Improvements in Hay-Stackers; and we do declare the following to be a full, clear, and exact description of the invention, such as will enable others skilled in the art to which it appertains to make and use the same.

Our invention which is an improved hay stacker has for its object to provide a simply constructed and inexpensive yet highly efficient and durable machine which may be easily operated and which may readily deliver hay to the peak of a stack, regardless of the inclination of the sides of said stack.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a longitudinal section of the improved stacker in normal position; Fig. 2 is a similar view with the stacking fork partially raised; Fig. 3 is a third longitudinal section with the stacking fork swung to its uppermost position; Fig. 4 is a top plan view; Fig. 5 is a vertical transverse section taken on the plane of the line 5—5 of Fig. 2; Fig. 6 is a detail sectional view on the plane of the line 6—6 of Fig. 1.

In specifically describing the construction shown in the drawings above briefly described, similar characters will be placed on corresponding parts throughout the several views and reference will be herein made to the numerous elements by their respective indices. To this end, the numeral 1 designates a suitable base including a pair of skids 2 rigidly connected by front and rear transverse bars 3 and 4. A stacking fork is mounted on the base in the usual manner, said fork including a pair of longitudinally extensible and contractible arms 5 and a suitable fork head 6 carried by the front ends thereof, the rear ends of said arms being pivoted at 7 to the base.

A derrick frame 8 is mounted on the base 1 for longitudinal swinging, said frame comprising a pair of vertical upwardly converging bars 9 whose lower ends are pivotally supported on a transverse shaft 10, a pair of longer bars 11 converging upwardly and forwardly from the lower ends of the bars 9 and preferably also mounted on shaft 10, brace bars 12 extending between the upper ends of the bars 9 and 11, and a pair of downwardly and forwardly diverging legs 13 secured adjustably between their ends to the intermediate portions of the bars 11 as indicated at 14, the lower ends of said legs being adapted to rest on the transverse bar 3 of the base 1 to limit the forward swinging of the entire derrick frame. Preferably though not necessarily, the upper ends of the bars 9 and the legs 13 as well as the rear ends of the brace bars 12 are all secured together by a single bolt 15 which serves as a shaft upon which a cable guide in the form of a pulley 16 is rotatably mounted, these parts however, being spaced sufficiently to prevent binding of said pulley by a sleeve or the like 17 surrounding the intermediate portion of bolt 15. The lower ends of bars 9 and 11 may be secured together if desired but they may well be spaced apart by a spacing bar 18 secured to the shaft 10 by U-bolts or the like 19. The upper ends of the bars 11 are spaced apart in any suitable manner and a second cable guiding pulley 20 is mounted between said ends as shown, other pulleys 21 and 22 being carried by the transverse bar 4 of the base 1.

A bail or the like 23 rises from the front ends of the arms 5 and one end of a cable 24 is secured to this bail, said cable being passed over the two pulleys 20 and 16, around the pulley 21, through an additional pulley 25 secured to said cable between the pulleys 20 and 16 and being finally passed around the pulley 22. The free end of this cable will be pulled upon by any suitable means as is usual in order to operate the stacker. As this is done, the cable travels over all of the pulleys until 25 comes in contact with 16 (see Fig. 2), the entire derrick frame 8 in the meantime remaining stationary with the result that the stacking fork is raised a predetermined amount. As pulley 25 is brought up against 16, the pull will no longer be exerted directly on the fork, but will be upon the pulley 16 of the derrick frame. This causes the entire frame to swing rearwardly carrying the fork therewith. When the fork assumes substantially an upright position, the power at the free end of the cable 24 will so pull upon 25 as to move the latter beyond 16 whereupon the cable between the pulley 25 and bail 23 will be put under further stress. This tends to tilt the fork rearwardly a greater distance in respect to the frame 8 and at the same time moves said frame rearwardly to its limit, that is, until the bars 9 strike the transverse bar 4. When this occurs, the fork will be a noticeable distance beyond a vertical plane, this permitting depositing of hay upon the peaks of stacks, regardless of the inclination of the sides of the latter.

Any preferred means may be employed for returning the numerous parts of the stacker to their normal positions, but for purposes of illustration we have shown a longitudinal bar 30 pivoted at its rear end upon a transverse shaft 31 carried by the base 1, the front end of said bar having mounted adjustably thereon a weight 32, said end of the bar being connected by a pair of cables 33 with the front ends of the fork arms 5. Thus, when said arms are raised as shown in Fig. 3, the bar 30 and its weight will be elevated, these parts serving to return the fork and the derrick frame when the load has been discharged.

To limit the swinging of the fork, a cable 34 is secured to the transverse bar 3 at one end and to the front end of the bar 30, said cable being normally slack but being drawn taut when the fork is raised as shown in Fig. 3.

By constructing the improved machine as shown and described it may be easily and inexpensively manufactured and may be placed on the market at a minimum cost. Regardless of these advantages, however, the machine will be highly efficient and durable.

Particular emphasis is laid upon the construction of the derrick frame and upon the manner in which the cable 24 is trained around the numerous pulleys, these being the most salient features of the invention in that it is through their instrumentality that the machine may operate in the advantageous manner described.

In the foregoing we have described certain specific details for accomplishing probably the best results, and in the drawings we have shown such details, but it is to be understood that numerous changes may be made within the scope of the invention as claimed without sacrificing the main advantages thereof.

We claim:

1. A hay stacker comprising a base, a fork including a pair of vertically swinging arms mounted on said base and a fork head carried by said arms, an upstanding swinging derrick frame mounted on said base and carrying a cable guide, a fork raising cable passing over said guide and connected with the fork, a second cable guide on the rear end of the base through which the free end of said cable passes, and a rigid leg secured to and extending forwardly from said derrick frame to rest on the base and limit the forward movement of said frame.

2. A hay stacker comprising a base, a fork including a pair of vertically swinging arms mounted on said base and a fork head carried by said arms, a derrick frame including a pair of substantially vertical upwardly converging bars pivoted at their lower ends to said base upon a transverse axis, a pair of longer bars inclining upwardly and forwardly from the lower ends of the other bars and converging upwardly, braces extending between the upper ends of the two pairs of bars, and a pair of downwardly and forwardly inclined legs secured at their upper ends to the upper ends of the first named bars, said legs diverging downwardly, being secured between their ends to the intermediate portions of said second named bars and being adapted to rest on the base to limit the forward movement of the derrick frame, a cable guide at the upper end of said second named bars, a second cable guide on the rear end of the base, and a cable connected to the fork and extending over the first named guide, the free end of said cable extending from the other guide.

3. A hay stacker comprising a base, a fork including a pair of vertically swinging arms mounted on the base and a fork head carried by said arms, a swinging derrick frame mounted on the base and having a pair of cable guides, one guide being spaced above and in rear of the fork head and the other being in rear of and below the first guide, a pair of cable guides on the rear end of the base, a cable secured to the fork and extending therefrom over the two guides of the derrick frame and through one of the guides on the base, and an additional cable guide secured on said cable between said guides of the derrick frame, said cable being carried forwardly from the last named guide on the base and passed through said additional guide, the free end of said cable being passed through the remaining guide on the base.

4. A hay stacker comprising a base, a fork including a pair of vertically swinging arms mounted on said bars and a fork head carried by said arms, a derrick frame including a pair of substantially vertical upwardly converging bars pivoted at their lower ends to said base upon a transverse axis, a pair of longer bars inclining upwardly and forwardly from the lower ends of the other bars and converging upwardly, braces extending between the upper ends of the two pairs of bars, and a pair of downwardly and forwardly inclining legs secured at their upper ends to the upper ends of the first named bars, said legs diverging downwardly, being secured between their ends to intermediate portions of said second named bars and being adapted to rest on the base to limit the forward movement of the derrick frame, a cable guide at the upper end of said second named bars, a second cable guide at the upper ends of said first named bars and a pair of cable guides on the rear end of the base, a cable secured at one end to the fork and passed over said first and second guides and through one guide on the base, and an additional cable guide secured on said cable between the first and second guides, said cable being extended forwardly from said guide on the base, passed through said additional guide and having its free end extended through the remaining guide on the base.

In testimony whereof we have hereunto set our hands in presence of two subscribing witnesses.

EDWARD LOOSBROCK.
JOHN P. KLOSTER, Jr.

Witnesses:
HENRY E. WIEGAND,
ED. O'SHEA.

Copies of this patent may be obtained for five cents each, by addressing the "Commissioner of Patents, Washington, D. C."